No. 806,657. PATENTED DEC. 5, 1905.
I. GUIOT.
RESILIENT WHEEL.
APPLICATION FILED APR. 19, 1904.
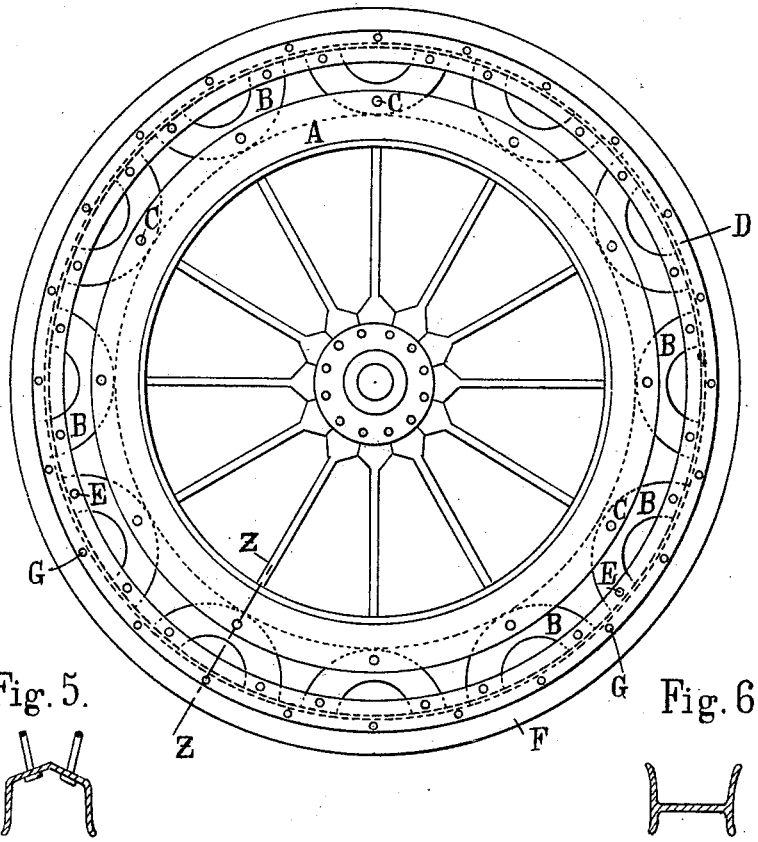
Fig. 1.
Fig. 5.
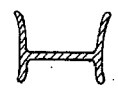
Fig. 6.
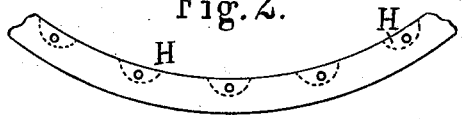
Fig. 2.
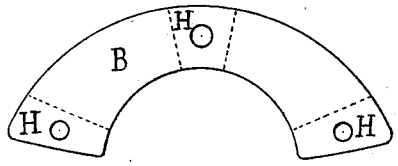
Fig. 3.
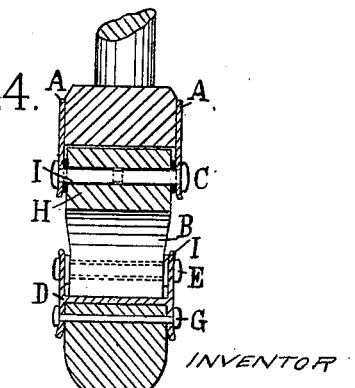
Fig. 4.
WITNESSES
INVENTOR
Irma Guiot
ATTORNEYS

UNITED STATES PATENT OFFICE.

IRMA GUIOT, OF PUYRICARD, FRANCE.

RESILIENT WHEEL.

No. 806,657.          Specification of Letters Patent.          Patented Dec. 5, 1905.

Application filed April 19, 1904. Serial No. 203,907.

*To all whom it may concern:*

Be it known that I, IRMA GUIOT, a citizen of France, and a resident of Puyricard, Bouches-du-Rhône, France, have invented certain new and useful Improvements in Resilient Wheels, of which the following is a specification.

This invention has for its object a resilient tire for all kinds of vehicles.

Figure 1 is an elevation of a wheel fitted with this improved resilient tire; Fig. 2, an elevation of a part of the rubber surrounding the external rim; Fig. 3, an elevation of one of the pieces of solid india-rubber forming a spring. Fig. 4 is a section of the tire on the line Z Z of Fig. 1. Fig. 5 is a section of the spoke-holding rim or felly. Fig. 6 is a section of the concentric second rim, which rim holds the tread or tire.

The wheel is provided on each side of its ordinary wood rim with two steel rings A, riveted to said rim, and which increase its diameter in such a way as to leave a circular space intended for receiving arc-shaped pieces of india-rubber B, forming springs. These pieces B, of india-rubber, are fixed to the two rings A by rivets C, which pass through them. A wheel-rim D, of steel and of slightly larger diameter than the wheel and concentric with the ordinary rim, receives in an internal circular space the ends of the india-rubber pieces, which are fixed by rivets E. The same rim D is surrounded externally by a band F or cushion of solid rubber, which is fixed to the said rim by rivets G.

The india-rubber pieces B, forming a spring, and the india-rubber F, forming the tread or tire, are made in a particular manner. The parts H, intended to receive the rivets, are of vulcanized india-rubber or ebonite, while the other parts are of ordinary flexible india-rubber in order to avoid any tearing. The holes intended to receive the rivets are also provided with sockets I, of copper or the like, in the form of collars, so as to avoid wear which might arise from friction against the rivets.

As regards the application of this resilient tire to a bicycle, Fig. 5 shows a section of the ordinary spoke-holding rim, and Fig. 6 a section of the second concentric rim, which carries the tread or india-rubber tire. The india-rubber pieces B, forming the springs, are of smaller dimensions, placed between the two rims and riveted in the manner stated.

The number and dimensions of the india-rubber blocks B, forming the springs, may vary according to the weight which it is intended the wheel shall carry.

I declare that what I claim is—

1. In combination in a wheel having a rim, a second rim of larger diameter than the first and surrounding the same and a number of india-rubber blocks placed between said rims so as to form springs, said blocks having parts of vulcanized india-rubber or ebonite adapted to receive the rivets for securing the blocks to the rim, substantially as described.

2. In combination with a wheel having rings connected thereto, solid india-rubber blocks in the form of an arc of a circle forming springs and having parts of vulcanized india-rubber or ebonite adapted to receive the rivets for fixing them to the rings.

In witness whereof I have hereunto set my hand in presence of two subscribing witnesses.

IRMA GUIOT.

Witnesses:
     EUGÉNE DUCASSON,
     VICTOR H. MORGAN.